US009934785B1

(12) United States Patent
Hulaud

(10) Patent No.: US 9,934,785 B1
(45) Date of Patent: Apr. 3, 2018

(54) IDENTIFICATION OF TASTE ATTRIBUTES FROM AN AUDIO SIGNAL

(71) Applicant: SPOTIFY AB, Stockholm (SE)

(72) Inventor: Stéphane Hulaud, Stockholm (SE)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 15/365,018

(22) Filed: Nov. 30, 2016

(51) Int. Cl.
| | | |
|---|---|---|
| G10L 15/00 | (2013.01) | |
| G06F 17/30 | (2006.01) | |
| G10L 15/22 | (2006.01) | |
| G10L 25/84 | (2013.01) | |
| G10L 25/63 | (2013.01) | |
| G10L 25/87 | (2013.01) | |
| G10L 15/18 | (2013.01) | |
| G06F 3/16 | (2006.01) | |
| G10L 15/02 | (2006.01) | |

(52) U.S. Cl.
CPC ............. *G10L 15/22* (2013.01); *G06F 3/165* (2013.01); *G06F 17/30743* (2013.01); *G10L 15/02* (2013.01); *G10L 15/1815* (2013.01); *G10L 15/1822* (2013.01); *G10L 25/63* (2013.01); *G10L 25/84* (2013.01); *G10L 25/87* (2013.01)

(58) Field of Classification Search
CPC ....... G10L 15/00; G10L 15/26; G10L 15/265; G10L 25/48; G10L 25/51; G10L 25/54; G10L 25/63; G01C 21/3608; G06F 17/30; G06F 17/30011
USPC ..... 704/231, 270, 270.1, 275; 707/600, 607, 707/705, 899
See application file for complete search history.

(56) References Cited

U.S. PATENT DOCUMENTS

| | | |
|---|---|---|
| 5,918,223 A | 6/1999 | Blum et al. |
| 5,919,047 A | 7/1999 | Sone |
| 6,539,395 B1 | 3/2003 | Gjerdingen et al. |
| 6,608,803 B2 | 8/2003 | Inoue et al. |
| 6,801,906 B1 | 10/2004 | Bates et al. |
| 6,865,173 B1 | 3/2005 | Czaja et al. |
| 7,013,301 B2 | 3/2006 | Holm et al. |
| 7,075,000 B2 | 7/2006 | Gang et al. |
| 7,081,579 B2 | 7/2006 | Alcalde et al. |
| 7,193,148 B2 | 3/2007 | Cremer et al. |
| 7,273,978 B2 | 9/2007 | Uhle |
| 7,277,766 B1 | 10/2007 | Khan et al. |
| 7,518,053 B1 | 4/2009 | Jochelson et al. |
| 7,612,275 B2 | 11/2009 | Seppanen et al. |

(Continued)

OTHER PUBLICATIONS

T. Polzin et al., "Detecting Emotions in Speech", https://www.ri.cmu.edu/pub_files/pub1/polzin_thomas_1998_1/polzin_thomas_1998_1.pdf (1998).

(Continued)

*Primary Examiner* — Paras D Shah
(74) *Attorney, Agent, or Firm* — Merchant & Gould P.C.

(57) ABSTRACT

A system, method and computer product are provided for processing audio signals. An audio signal of a voice and background noise is input, and speech recognition is performed to retrieve speech content of the voice. There is retrieval of content metadata corresponding to the speech content, and environmental metadata corresponding to the background noise. There is a determination of preferences for media content corresponding to the content metadata and the environmental metadata, and an output is provided corresponding to the preferences.

19 Claims, 3 Drawing Sheets

(56) References Cited

U.S. PATENT DOCUMENTS

| | | |
|---|---|---|
| 7,678,984 B1 | 3/2010 | Lamere |
| 7,698,009 B2 | 4/2010 | Cotey et al. |
| 2002/0002899 A1 | 1/2002 | Gjerdingen et al. |
| 2002/0169743 A1 | 11/2002 | Arnold et al. |
| 2002/0172379 A1 | 11/2002 | Cliff |
| 2002/0181711 A1 | 12/2002 | Logan et al. |
| 2003/0086341 A1 | 5/2003 | Wells et al. |
| 2003/0191764 A1 | 10/2003 | Richards |
| 2003/0205124 A1 | 11/2003 | Foote et al. |
| 2003/0220908 A1 | 11/2003 | Chou |
| 2003/0229537 A1 | 12/2003 | Dunning et al. |
| 2004/0034441 A1 | 2/2004 | Eaton et al. |
| 2004/0122662 A1 | 6/2004 | Crockett |
| 2004/0199491 A1 | 10/2004 | Bhatt |
| 2004/0215453 A1* | 10/2004 | Orbach ............. G10L 15/005 704/231 |
| 2004/0231498 A1 | 11/2004 | Li et al. |
| 2005/0050047 A1 | 3/2005 | Laronne et al. |
| 2005/0160107 A1 | 7/2005 | Liang |
| 2005/0249075 A1 | 11/2005 | Laronne et al. |
| 2005/0289600 A1 | 12/2005 | Kawahara et al. |
| 2006/0065102 A1 | 3/2006 | Xu |
| 2006/0065105 A1 | 3/2006 | Iketani et al. |
| 2006/0075886 A1 | 4/2006 | Cremer et al. |
| 2006/0149552 A1 | 7/2006 | Bogdanov |
| 2006/0153286 A1 | 7/2006 | Andersen et al. |
| 2006/0289622 A1* | 12/2006 | Khor ................. G06Q 30/02 235/375 |
| 2007/0043768 A1 | 2/2007 | Kang et al. |
| 2007/0047719 A1* | 3/2007 | Dhawan ........... H04M 1/2478 379/235 |
| 2007/0094215 A1 | 4/2007 | Toms et al. |
| 2007/0106405 A1 | 5/2007 | Cook et al. |
| 2007/0150515 A1 | 6/2007 | Brave et al. |
| 2007/0256093 A1 | 11/2007 | Hiler |
| 2007/0261537 A1 | 11/2007 | Eronen et al. |
| 2008/0018503 A1 | 1/2008 | Kim et al. |
| 2008/0097633 A1 | 4/2008 | Jochelson et al. |
| 2008/0101762 A1 | 5/2008 | Kellock et al. |
| 2008/0124042 A1 | 5/2008 | Divakaran et al. |
| 2008/0189330 A1 | 8/2008 | Hoos et al. |
| 2008/0193017 A1 | 8/2008 | Wilson et al. |
| 2008/0236371 A1 | 10/2008 | Eronen |
| 2008/0240379 A1* | 10/2008 | Maislos ........... G06F 17/30855 379/88.13 |
| 2008/0275580 A1 | 11/2008 | Andersen |
| 2010/0031142 A1* | 2/2010 | Nagatomo ............. G10L 15/26 715/254 |
| 2010/0063880 A1* | 3/2010 | Atsmon ............. G06Q 10/0637 705/14.53 |
| 2010/0142715 A1* | 6/2010 | Goldstein ......... G06F 17/30743 381/56 |
| 2010/0169091 A1* | 7/2010 | Zurek ................... G06Q 30/02 704/235 |
| 2012/0201362 A1* | 8/2012 | Crossan ................. G10L 15/26 379/88.01 |
| 2012/0224706 A1* | 9/2012 | Hwang ................. G10L 15/10 381/56 |
| 2013/0167029 A1* | 6/2013 | Friesen ................... G06F 3/167 715/716 |
| 2013/0339334 A1* | 12/2013 | Brown ............. G06F 17/30867 707/706 |
| 2014/0303974 A1* | 10/2014 | Ashikawa ............. G10L 15/26 704/235 |
| 2015/0154002 A1* | 6/2015 | Weinstein ............... G06F 3/167 715/728 |
| 2016/0104486 A1* | 4/2016 | Penilla .................... H04L 67/12 704/232 |
| 2016/0125876 A1* | 5/2016 | Schroeter ................ G10L 15/20 704/226 |
| 2016/0163332 A1* | 6/2016 | Un .......................... G10L 13/08 704/260 |
| 2016/0336005 A1* | 11/2016 | Cao .................. G06F 17/30867 |
| 2016/0378747 A1* | 12/2016 | Orr ........................ G06F 3/167 704/9 |
| 2017/0054788 A1* | 2/2017 | Liu .................. G06F 17/30017 |
| 2017/0213247 A1* | 7/2017 | Balasubramanian ...................... G06Q 30/0255 |

OTHER PUBLICATIONS

Md. Ali et al., "Gender Recognition System Using Speech Signal", http://airccse.org/journal/ijcseit/papers/2112ijcseit01.pdf (2012).

Jean-Luc Rouas et al., "Language and variety verification on broadcast news for Portuguese", http://www.inesc-id.pt/pt/indicadores/Ficheiros/4871.pdf (2008).

* cited by examiner

IDENTIFICATION OF TASTE ATTRIBUTES FROM AN AUDIO SIGNAL

BACKGROUND OF THE INVENTION

Field of the Invention

Example aspects described herein relate generally to acoustic analysis, and more particular to systems, methods and computer products for identifying taste attributes of a user from an audio signal.

DESCRIPTION OF RELATED ART

In the field of on-demand media streaming services, it is common for a media streaming application to include features that provide personalized media recommendations to a user. These features typically query the user to identify preferred content among a vast catalog of media that is predicted to match the consumer taste, i.e., listening or viewing preferences of the user.

For example, one approach to identifying consumer taste is to query the user for basic information such as gender or age, to narrow down the number of possible recommendations. The user is then further asked to provide additional information to narrow down the number even further. In one example, the user is pushed to a decision tree including, e.g., artists or shows that the user likes, and fills in or selects options to further fine-tune the system's identification of their tastes.

One challenge involving the foregoing approach is that it requires significant time and effort on the part of the user. In particular, the user is required to tediously input answers to multiple queries in order for the system to identify the user's tastes.

What is needed is an entirely different approach to collecting taste attributes of a user, particularly one that is rooted in technology so that the above-described human activity (e.g., requiring a user to provide input) is at least partially eliminated and performed more efficiently.

There is also a need to improve the operation of a computer or special purpose device that provide content based on user tastes by minimizing the processing time needed to compile taste profile information.

BRIEF DESCRIPTION

The example embodiments described herein provide methods, systems and computer products for processing audio signals. An audio signal of a voice and background noise is input, and speech recognition is performed to retrieve speech content of the voice. Content metadata corresponding to the speech content, and environmental metadata corresponding to the background noise is retrieved. In turn, a determination of preferences for media content corresponding to the content metadata and the environmental metadata, and an output is provided corresponding to the preferences.

In one example aspect, the content metadata indicates an emotional state of a speaker providing the voice.

In another example aspect, the content metadata indicates a gender of a speaker providing the voice.

In yet another example aspect, the content metadata indicates an age of a speaker providing the voice.

In still another example aspect, the content metadata indicates an accent of a speaker providing the voice.

In another aspect, the environmental metadata indicates aspects of a physical environment in which the audio signal is input.

In yet another aspect, the environmental metadata indicates a number of people in the environment in which the audio signal is input.

In another aspect, the input audio signal is filtered and formatted before the speech content is retrieved.

In one aspect, the speech content is normalized to remove duplicated and filler words, and to parse and format the speech content.

In another example aspect, the audio signal is input from a user in response to querying the user to provide an audio signal.

In still another example aspect, the output is audio output of music corresponding to the preferences.

In another example aspect, the output is a display of recommended next music tracks corresponding to the preferences.

In another example aspect, the preferences also correspond to historical listening practices of a user who provides the voice.

In another example aspect, the preferences also are associated with preferences of friends of a user who provides the voice.

BRIEF DESCRIPTION OF THE DRAWINGS

The features and advantages of the example embodiments of the invention presented herein will become more apparent from the detailed description set forth below when taken in conjunction with the following drawings.

DESCRIPTION

The example embodiments of the invention presented herein are directed to methods, systems and computer program products for processing audio signals to determine taste attributes. Generally, example aspects provide a framework that provides media content preferences (such as a next musical track to play) from an audio signal such as a user's voice.

Figure 1:
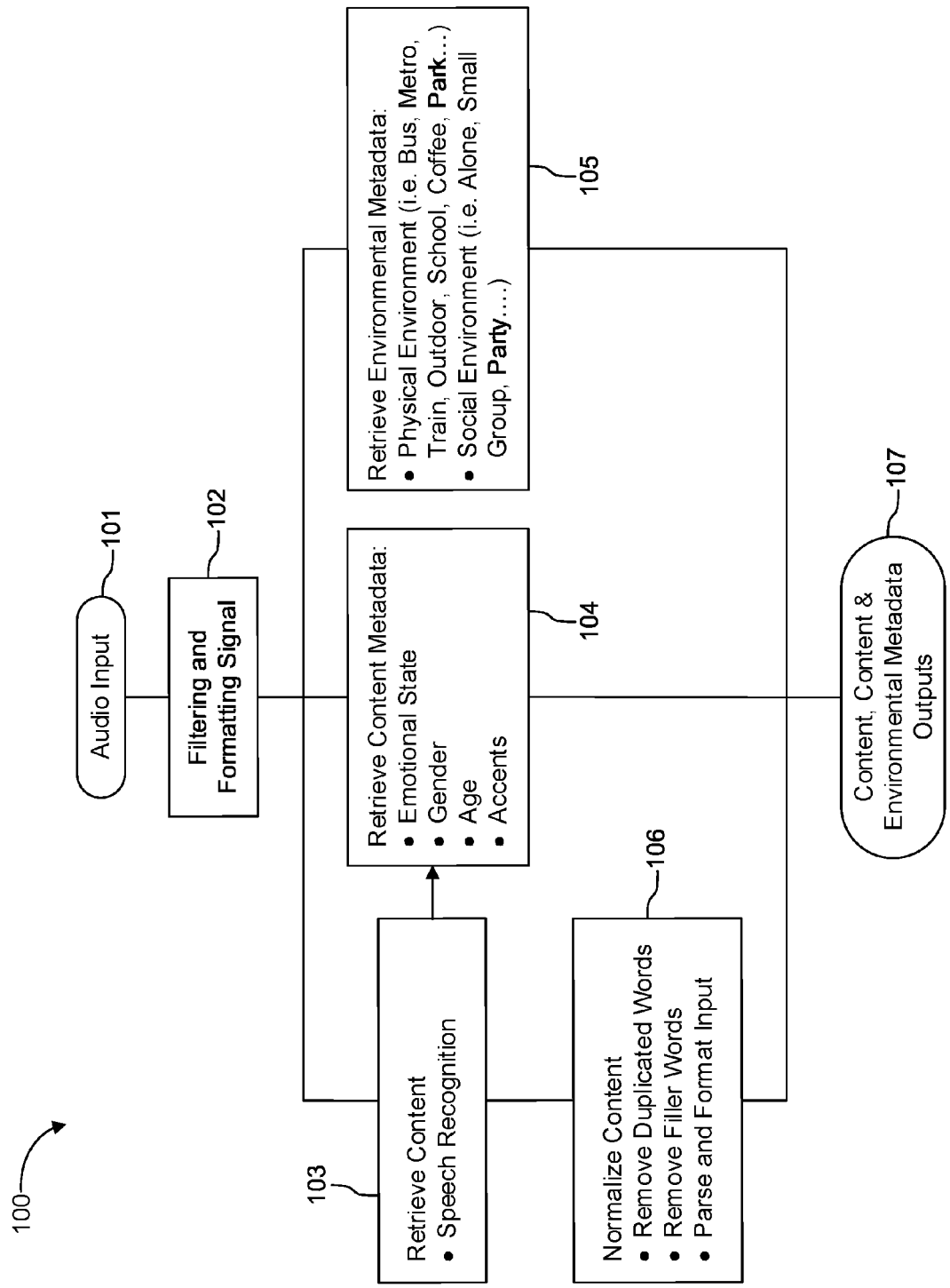
FIG. 1 is a flow diagram illustrating a process for processing audio signals according to an example embodiment.

FIG. 1 is a flow diagram illustrating a process for determining taste attributes for media content according to an example embodiment.

Briefly, according to FIG. 1, audio signals of a voice (also referred to as voice signals) and background noise are received by a microphone. In turn, an audio signal processor to converts the voice signals to digital or other representations for storing or further processing. In one embodiment an audio signal processor performs a voice recognition process on the voice signals to generate digitized speech content of the voice signals that can be stored and further processed. The digitized speech content and background noise are, in turn, further processed to retrieved voice content metadata corresponding to the speech content and environmental metadata corresponding to the background noise. A processing unit (e.g., a computer processor) processes the voice content metadata and environmental metadata to generate taste attributes that can be used to determine preferences for media content. The taste attributes are output, for example, through a network interface.

Thus, in step 101, audio signals are received by a microphone communicatively coupled to an audio signal processor. In one example, the audio signals include voice signals and background noise received via a mobile device (e.g., via a call from a mobile device or through an application that causes the mobile device to receive and process audio signals). In one embodiment, the mobile device transmits the audio signals to another remote system for processing, or processing might be performed in the mobile device itself The audio signals may be recorded in real-time, or may correspond to previously-recorded audio signals.

In step 102, the input audio signals are filtered and formatted. Thus, for example, the audio signal might be processed to remove silences from the beginning and/or the end of the audio input.

In step 103, speech recognition is performed to retrieve content. Prior to extracting the content or performing speech recognition, additional processing can be applied to the input audio signal, such as using frequency-division multiplexing to filter frequencies and/or parsing input speech into blocks or chunks more suitable for subsequent speech processing. For example, an audio filter can filter certain identified audio frequencies from the audio signals. Thus, in such implementations, the audio filter can be a means for filtering, from the audio signal, one or more audio frequencies associated with devices or objects causing background noise. In addition, one or more audio frequencies can be filtered from the voice signals, thereby resulting in filtered signals that will more clearly reflect human speech. In another example, linear predictive coding (LPC) can be used to break the digitally recorded human speech into short segments, which can then be characterized according to the parameters of a model. The segment information can then be transmitted or stored as needed, and then reconstructed with a speech synthesizer.

According to one embodiment, the retrieved "content" is one or more text objects corresponding to the user's voice and having a type such as verb, sentence, noun, and the like. The object itself is the word or group of items recognized, and the content object might further include, e.g., an element representing a level of emphasis on the word or words based on volume or pronunciation speed, or an element indicating a confidence level that the speech-to-text-system has identified the correct word. Thus, according to this embodiment, the content can be an object data structure including a text representation of the audio of the user's voice, along with any corresponding additional data such as that mentioned above. Speech recognition can be performed using a number of existing methodologies such as hidden Markov Models (HMM), dynamic time warping (DTW)-based speech recognition, neural networks, Viterbi decoding, and deep feed-forward and recurrent neural networks.

In one implementation, the speech content is modified in step 106, either before or after processing for metadata. For example, the speech content can be normalized to remove duplicated and filler words, and to parse and format the input. In another example, the speech content might be processed to eliminate words or phrases below a particular confidence level.

In step 104, content metadata corresponding to the content (speech) is obtained. For example, such metadata might include an emotional state, a gender, an age, or an accent of the speaker. Thus, in one example aspect, the content metadata indicates an emotional state of a speaker providing the voice. In another example aspect, the content metadata indicates a gender of a speaker providing the voice. In yet another example aspect, the content metadata indicates an age of a speaker providing the voice. In still another example aspect, the content metadata indicates an accent of a speaker providing the voice. These aspects are described more fully below.

Environmental metadata is retrieved in step 105, based on the background noise from the input audio signal. Background noise might include, for example, sounds from vehicles on a street, other people talking, birds chirping, printers printing, and so on. Thus, the background noise can correspond to any noises in the audio signal that are not the primary speaker's voice (although the background noise might correspond to someone else's voice(s) as part of a social environment, e.g., many people in a room). From this, it is possible to retrieve environmental metadata such as a physical environment (e.g., bus, train, outdoors, school, coffee shop), as well as a social environment (e.g., alone, small group, large party).

The content metadata and environmental metadata will now be described in more detail.

In one example, the content, content metadata and environmental metadata are structured as a data object as follows:

```
{
"content":<content object>
"content_metadata":<content metadata object>
"environmental_metadata":<environmental metadata object>
}
```

The content object could be structured as a syntax tree using lexical semantics, in which the units of syntactical units include not only words but also sub-words or sub-units, as well as compound words and phrases. For example, the content object structure for the voice speech "Play some groovy jazz!" might include:

```
"content":{"type":"s", "object":[
    {"type":"v", "object":"play", "emphasis":0.142,
"confidence":0.876},
    {"type":"np", "object":[
        {"type":"det", "object":"some", "emphasis":0.13 ,
"confidence":0.729},
        {"type":"adj", "object":"groovy",
"emphasis":0.342, "confidence":0.274},
        {"type":"n", "object":"jazz", "emphasis":0.385,
"confidence":0.917}
```

In the above example, "type" corresponds to an item type, i.e., "s" for a sentence, "v" for a verb, "np" for a noun phrase, "det" for a determiner, and "adj" for an adjective. Meanwhile, "object" corresponds to the word or group of items which are recognized by the speech recognition, i.e., "play some groovy jazz" or simply "jazz". "Emphasis" indicates how much the user emphasizes a particular word based on, for example, a volume level or a pronunciation speed, and "confidence" indicates the confidence level that a speech-to-text sub-system has identified the proper word.

In one example, the content metadata object is an aggregation of all the possible fields for that content. In particular, a content metadata object might be structured as follows:

```
"content_metadata":
{
    "emotions":<emotions object>,
    "gender":<gender object>,
    "age":<age object>,
    "accents":[<accent objects>],
    . . .
}
```

In the above example, the emotions object could be classified using any number of approaches. One approach is Parrott's emotions by groups, which uses a tree-structured list of emotions with levels (e.g., primary, secondary, tertiary). A more basic approach might simply categorize the emotion into happy, angry, afraid, sad or neutral. For example, prosodic information (e.g., intonation, stress, rhythm and the like of units of speech) can be combined and integrated with acoustic information within a hidden Markov model architecture, which allows one to make observations at a rate appropriate for the phenomena to be modeled. Using this architecture, that prosodic information allows the emotional state of a speaker to be detected and categorized. See https://www.ri.cmu.edu/pub_files/pub1/polzin_thomas_1998_1/polzin_thomas_1 998_1.pdf. In another example, a sequential forward selection (SFS) method might use Bayes' classifiers to discover which audio features classify emotions of learning samples in the best way.

Thus, according to the above examples, the emotions object might be structured as follows:

Parrott's emotions by groups example:
"emotions":
{
  "primary":"joy", "confidence":0.876,
  "secondary":"cheerfulness", "confidence":0.876,
  "tertiary":"delight", "confidence":0.876
}
Simpler approach:
"emotions":
{
  "type":"happy", "confidence":0.876
}

Returning to the content metadata object, "gender" can also be classified. For example, a gender recognition system can be used to extract the gender related information from a speech signal and represent it by a set of vectors called a feature. Features such as power spectrum density or frequency at maximum power can carry speaker information. The feature is extracted using First Fourier Transform (FFT) algorithm. Then, the task of the back-end system (also called classifier) is to create a gender model to recognize the gender from his/her speech signal in the recognition phase. See http://airccse.org/journal/ijcseit/papers/2112ijcseit01.pdf. One such model might use neural networks as classifiers for audio feature vectors, based on frequency differences in the audio signal.

Meanwhile, age can be roughly determined based on, e.g., a combination of vocal tract length and pitch, or an i-vector approach in which modeling is used with lower-dimension vectors.

Objects for gender and age might be structured as follows:
Simple structure:
"age":
{
  "value":24, "confidence":0.83
}
"gender:"
{
  "value":male, "confidence":0.89
}

Returning again to the content metadata object, the "accents" object can be structured as follows:
Simple structure:
"accents":
{[
  {"type":"us:west-coast", "confidence":0.71},
  "type":"latin-american", "confidence":0.63}
]}.

In this regard, various approaches can be used to match a voice to a particular accent. For example, a language/accent verification system for one or more languages can be used to extract different type of properties: acoustic, phonotactic and prosodic. In a first stage, for each automatically detected speaker, the system verifies if the spoken language is a particular language, as opposed to other languages. A second stage further identifies the variety of the particular language. In one example, this process can be performed in a pre-processing module before the completion of speech recognition. The accent identification results can be, e.g., saved with the corresponding speech data, marked as untranscribable, or alternatively forwarded to another system tuned for other languages or varieties. See, e.g., http://www.inesc-id.pt/pt/indicadores/Ficheiros/4871.pdf.

It should be understood that the above example metadata categories of emotions, gender, age and accent are merely examples, and numerous other characterizations and classifications can be used.

Returning to FIG. 1, environmental metadata is also retrieved, on the basis of the background noise in the audio signal, i.e., the audio that is not the voice of the speaker. In that regard, the filtering of the input audio signal to identify the human speech might also, by definition, identify the remaining parts of the audio signal which are not human speech. These parts can then be categorized into different types of metadata using, e.g., methods similar to those used to categorize the speech. For example, in one aspect, the environmental metadata indicates aspects of a physical environment in which the audio signal is input. In one example, the environmental metadata indicates a number of people in the environment in which the audio signal is input. In another example, the environmental metadata might indicate a location or noise level.

The environmental metadata object, similar to the content metadata object, might in one example be structured as an aggregation of all the possible fields for that environment, such as:

"environmental_metadata":
{
  "physical":<physical object>,
  "social":<social object>,
}
The physical and social objects can be structured as follows:
"physical":
{
  "keyword":"commute:bus",  "noise_level":0.241,
     "confidence":0.925
}
"social":
{
  "keyword":"alone", "confidence":0.876}
}

Again, it should be understood that the above environmental metadata are merely examples, and numerous other characterizations and classifications can be used.

In step 107, the content, content metadata and environmental metadata are output. The output may be of these items as is, or may be further utilized to select corresponding content. Thus, the output might simply be to provide a recommendation on a visual display.

Figure 2:
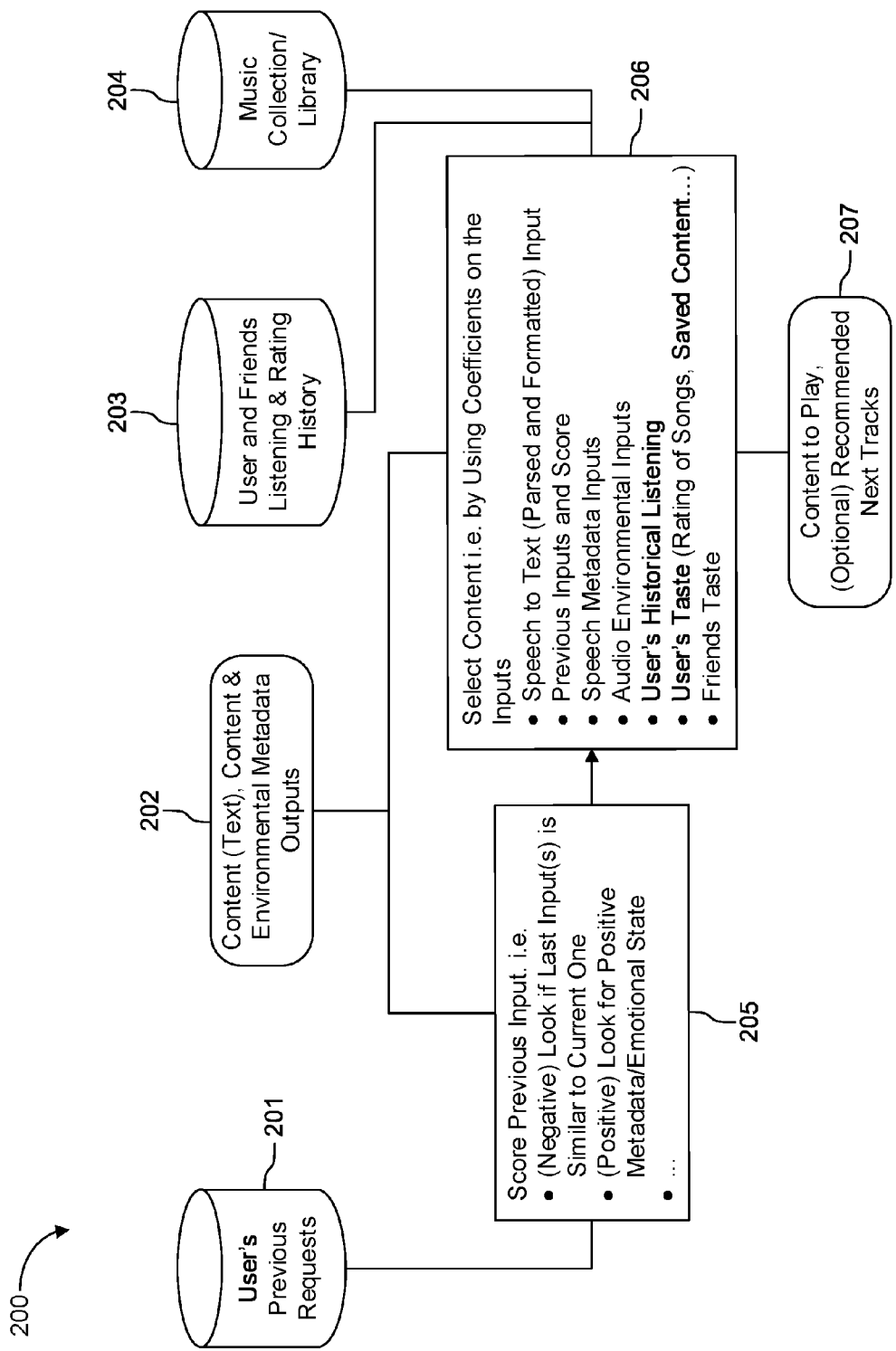
FIG. 2 is block diagram of a system for processing audio signals according to an example embodiment.

FIG. 2 is block diagram of a system for processing audio signals according to an example embodiment.

As shown in FIG. 2, a system might include data storage 201 for storing a user's previous requests and/or outputs. Meanwhile, the content, content metadata and environmental data outputs 202 correspond to the same elements described above, and are also input to the system. The system might further use storage 203 to store a user profile including, e.g., a listening and rating history and links to associated profiles such as those of the user's friends or colleagues, as well as storage 204 for the user's existing music collection and/or library.

Thus, in some example aspects, preferences also correspond to (or take into account) historical listening practices of a user who provides the voice, and may be associated with preferences of friends of a user who provides the voice.

In a step 205, the user's previous input and/or output are scored. For example, a negative score might be assigned to a previous input if the previous input is similar to the current one, whereas a positive score might be assigned to a positive emotional state. In another example, the user's output might also be scored. For example, if the user is happy, it will mean that the last input and output were correct (the user intent was understood and the content selected was appropriate). Numerous other examples are possible.

These scores are then fed to step 206, where content is selected using the information. Thus, content might be selected by using the following: speech to text (parsed and formatted) input, previous inputs and outputs and scores, content (speech) metadata inputs, audio environmental inputs, the user's historical listening, the user's previous explicit indications of taste (e.g., ratings of songs, saved content), the user's friends' tastes, and the like.

In step 207, the selected content to play, or, for example, to be recommended next is provided as output to the user. In one example, the output might simply be to play the next content. In another example, the output might be a recommendation on a visual display. Accordingly, in one aspect, the output is audio output of music corresponding to the preferences. In another example aspect, the output is a display of recommended next music tracks corresponding to the preferences.

Figure 3:
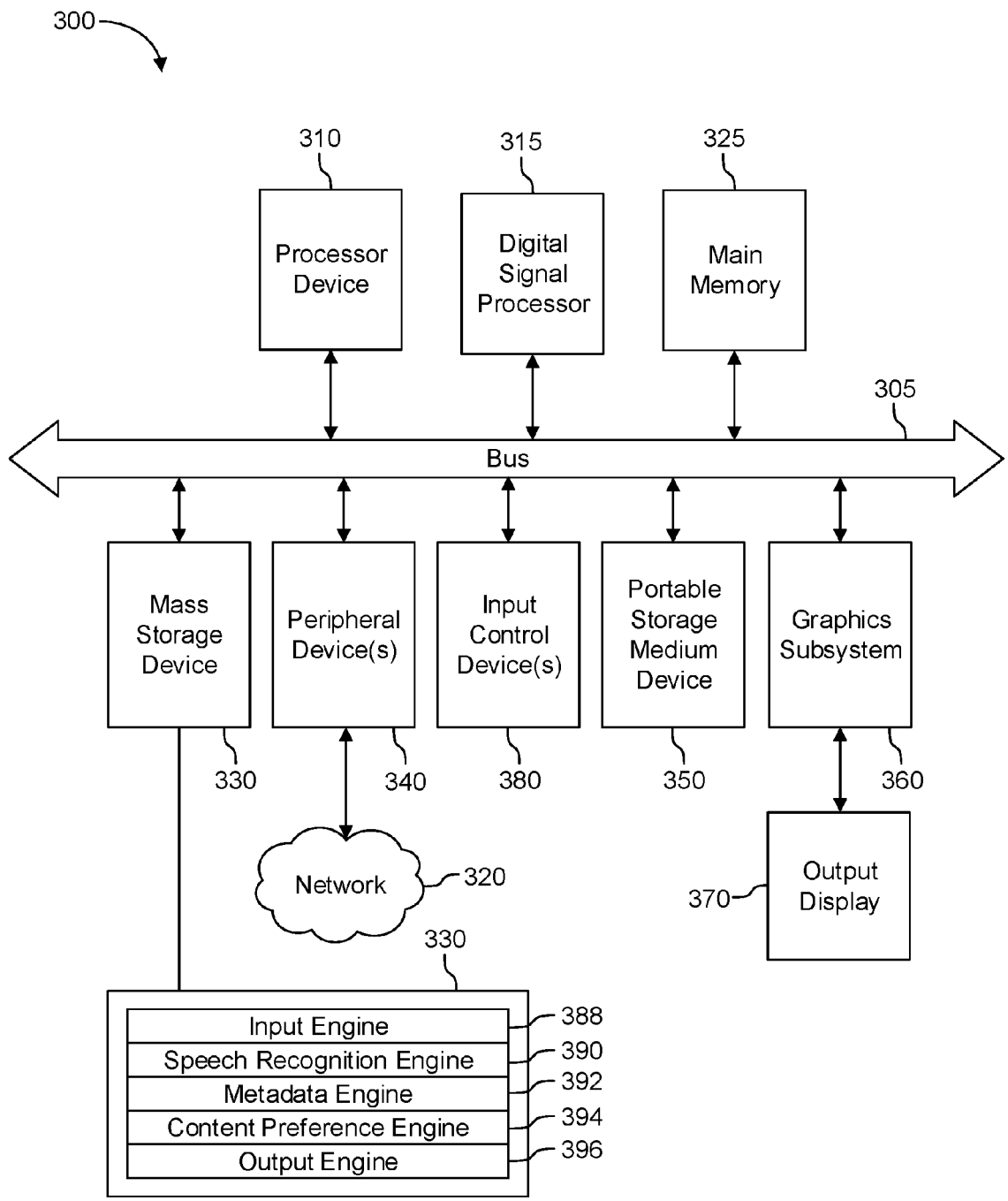
FIG. 3 is a block diagram illustrating an example preference determination system constructed to determine preferences for media content from an audio signal according to an example embodiment.

FIG. 3 is a block diagram illustrating an example taste attribute identification system constructed to determine preferences for media content from an audio signal according to an example embodiment.

Taste attribute identification system 300 may include without limitation a processor device 310, a main memory 325, and an interconnect bus 305. The processor device 310 may include without limitation a single microprocessor, or may include a plurality of microprocessors for configuring the system 300 as a multi-processor acoustic attribute computation system. The main memory 325 stores, among other things, instructions and/or data for execution by the processor device 310. The main memory 325 may include banks of dynamic random access memory (DRAM), as well as cache memory.

The system 300 may further include a mass storage device 330, peripheral device(s) 340, portable non-transitory storage medium device(s) 350, input control device(s) 380, a graphics subsystem 360, and/or an output display interface 370. A digital signal processor (DSP) 315 may also be included to perform audio signal processing. For explanatory purposes, all components in the system 300 are shown in FIG. 3 as being coupled via the bus 305. However, the system 300 is not so limited. Elements of the system 300 may be coupled via one or more data transport means. For example, the processor device 310, the digital signal processor 315 and/or the main memory 325 may be coupled via a local microprocessor bus. The mass storage device 330, peripheral device(s) 340, portable storage medium device(s) 350, and/or graphics subsystem 360 may be coupled via one or more input/output (I/O) buses. The mass storage device 330 may be a nonvolatile storage device for storing data and/or instructions for use by the processor device 310. The mass storage device 330 may be implemented, for example, with a magnetic disk drive or an optical disk drive. In a software embodiment, the mass storage device 330 is configured for loading contents of the mass storage device 330 into the main memory 325.

Mass storage device 330 additionally stores a input engine 388 for inputting an audio signal of a voice and background noise, a speech recognition engine 390 for performing speech recognition to retrieve speech content of the voice, a metadata engine 392 for retrieval of content metadata corresponding to the speech content, and environmental metadata corresponding to the background noise, a content preference engine 394 for determination of preferences for media content corresponding to the content metadata and the environmental metadata, and an output engine 396 for providing output corresponding to the preferences, as discussed above in connection with FIGS. 1-2.

The portable storage medium device 350 operates in conjunction with a nonvolatile portable storage medium, such as, for example, a solid state drive (SSD), to input and output data and code to and from the system 300. In some embodiments, the software for storing information may be stored on a portable storage medium, and may be inputted into the system 300 via the portable storage medium device 350. The peripheral device(s) 340 may include any type of computer support device, such as, for example, an input/output (I/O) interface configured to add additional functionality to the system 300. For example, the peripheral device(s) 340 may include a network interface card for interfacing the system 300 with a network 320.

The input control device(s) 380 provide a portion of the user interface for a user of the computer 300. The input control device(s) 380 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the system 300 may include the graphics subsystem 360 and the output display 370. The output display 370 may include a display such as a CSTN (Color Super Twisted Nematic), TFT (Thin Film Transistor), TFD (Thin Film Diode), OLED (Organic Light-Emitting Diode), AMO-LED display (Activematrix organic light-emitting diode), and/or liquid crystal display (LCD)-type displays. The displays can also be touchscreen displays, such as capacitive and resistive-type touchscreen displays.

The graphics subsystem 360 receives textual and graphical information, and processes the information for output to the output display 370.

Input control devices 380 can control the operation and various functions of system 300.

Input control devices 380 can include any components, circuitry, or logic operative to drive the functionality of system 300. For example, input control device(s) 380 can include one or more processors acting under the control of an application.

Each component of system 300 may represent a broad category of a computer component of a general and/or special purpose computer. Components of the system 300 are not limited to the specific implementations provided herein.

Software embodiments of the examples presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the system and for enabling the system or microprocessor to interact with a human user or other mechanism utilizing the results of the example embodiments of the invention. Such software may include without limitation device drivers, operating systems, and user applications. Ultimately, such computer-readable media further include software for performing example aspects of the invention, as described above.

Included in the programming and/or software of the system are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-3 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method of processing audio signals, comprising the steps of:

retrieving at least one content object generated by an audio signal processing system, the at least one content object including (1) one or more text objects corresponding to one or more words and (2) one or more text object data elements representing (i) a type representing the one or more text objects as at least one of a sentence, a verb, a noun phrase a determiner, and an adjective (ii) an emphasis level value representing a level of emphasis of the one or more words, correspondingly and (iii) an electronically generated confidence level value representing a confidence level that the audio signal processing system has properly identified the one or more words from an audio signal;

retrieving content metadata generated by the audio signal processing system, the content metadata corresponding to the one or more words and including (i) one or more content metadata objects and (ii) a content metadata object confidence level value representing the confidence level that the audio signal processing system has properly identified the one or more content metadata objects, wherein the one or more content metadata objects include at least one of an emotion object, a gender object, an age object and an accent object;

retrieving environmental metadata, generated by the audio signal processing system, the environmental metadata corresponding to the background noise and including (i) one or more environmental metadata objects and (ii) an environmental metadata object confidence level value representing the audio signal processing system has properly identified the one or more environmental metadata objects from the audio signal;

retrieving, from a profile database, a user profile containing historical listening practices of a user;

determining, based on the user profile, the at least one content object, the content metadata and the environmental metadata, at least one of (i) media content and (ii) a recommended next media track; and outputting, on an electronic device, at least one of the media content and the recommended next media track, wherein the outputting comprises playing the media content or displaying the recommended next media track, correspondingly, wherein when the recommended next media track is selected, media content corresponding to the recommended next media track is played.

2. The method according to claim 1, wherein the environmental metadata indicates aspects of a physical environment in which the audio signal is input.

3. The method according to claim 1, wherein the environmental metadata indicates a number of people in the environment in which the audio signal is input.

4. The method according to claim 1, further comprising:
inputting, into an audio signal processor, an audio signal of a voice and background noise;
performing, using the audio signal processor, speech recognition to retrieve speech content of the voice, the speech content containing a plurality of portions, each of the plurality of portions of the speech content including the one or more words; and
performing, using the audio signal processor, background noise detection to detect the background noise.

5. The method according to claim 1, wherein the content objects are normalized to remove duplicated and filler words, and to parse and format the content objects.

6. The method according to claim 4, wherein the audio signal is input to the electronic device in response to outputting, on the electronic device, a query to provide an audio signal.

7. The method according to claim 1, wherein the media content is music.

8. The method according to claim 1, wherein the recommended next media track is a recommended next music track.

9. The method according to claim 1, further comprising:
retrieving, from the profile database, at least one other user profile containing historical listening practices of at least one other user, and the determining is based also on the historical listening practice of the at least one other user.

10. A system for processing audio signals, comprising:
at least one processor configured to:
retrieve at least one content object generated by an audio signal processing system, the at least one content object including (1) one or more text objects corresponding to one or more words and (2) one or more text object data elements representing (i) a type representing the one or more text objects as at least one of a sentence, a verb, a noun phrase a determiner, and an adjective (ii) an emphasis level value representing a level of emphasis of the one or more words, correspondingly and (iii) an electronically generated confidence level value representing a confidence level that the audio signal processing system has properly identified the one or more words from an audio signal;
retrieve content metadata, generated by the audio signal processing system, the content metadata corresponding to the one or more words and including (i) one or more content metadata objects and (ii) a content metadata object confidence level value representing the confidence level that the audio signal processing system has properly identified the one or more content metadata objects, wherein the one or more content metadata objects include at least one of an emotion object, a gender object, an age object and an accent object;
retrieve environmental metadata, generated by the audio signal processing system, the environmental metadata corresponding to the background noise and including (i) one or more environmental metadata objects and (ii) an environmental metadata object confidence level value representing the audio signal processing system has properly identified the one or more environmental metadata objects from the audio signal;
retrieve, from a profile database, a user profile containing historical listening practices of a user;
determine, based on the user profile, the at least one content object, the content metadata and the environmental metadata, at least one of (i) media content and (ii) a recommended next media track; and
cause at least one of the media content and the recommended next media track to be output on an electronic device, wherein the outputting comprises playing the media content or displaying the recommended next media track, correspondingly,
wherein when the recommended next media track is selected, media content corresponding to the recommended next media track is played.

11. A non-transitory computer-readable storage medium storing a program for causing a computer to implement a method of processing audio signals, comprising the steps of:
retrieving at least one content object generated by an audio signal processing system, the at least one content object including (1) one or more text objects corresponding to one or more words and (2) one or more text object data elements representing at least one of (i) a type representing the one or more text objects as at least one of a sentence, a verb, a noun phrase a determiner, and an adjective (ii) an emphasis level value representing a level of emphasis of the one or more words, correspondingly and (iii) an electronically generated confidence level value representing a confidence level that the audio signal processing system has properly identified the one or more words from an audio signal;
retrieving content metadata generated by the audio signal processing system, the content metadata corresponding to the one or more words and including (i) one or more content metadata objects and (ii) a content metadata object confidence level value representing the confidence level that the audio signal processing system has properly identified the one or more content metadata objects, wherein the one or more content metadata objects include at least one of an emotion object, a gender object, an age object and an accent object;
retrieving environmental metadata, generated by the audio signal processing system, the environmental metadata corresponding to the background noise and including (i) one or more environmental metadata objects and (ii) an environmental metadata object confidence level value representing the audio signal processing system has properly identified the one or more environmental metadata objects from the audio signal;
retrieving, from a profile database, a user profile containing historical listening practices of a user;
determining, based on the user profile, the at least one content object, the content metadata and the environmental metadata, at least one of (i) media content and (ii) a recommended next media track; and
outputting, on an electronic device, at least one of the media content and the recommended next media track, wherein the outputting comprises playing the media content or displaying the recommended next media track, correspondingly,
wherein when the recommended next media track is selected, media content corresponding to the recommended next media track is played.

12. The system according to claim 10, wherein the environmental metadata indicates aspects of a physical environment in which the audio signal is input.

13. The system according to claim 10, wherein the environmental metadata indicates a number of people in the environment in which the audio signal is input.

14. The system according to claim 10, wherein the at least one processor is further configured to:
   input, into an audio signal processor, an audio signal of a voice and background noise;
   perform, using the audio signal processor, speech recognition to retrieve speech content of the voice, the speech content containing a plurality of portions, each of the plurality of portions of the speech content including the one or more words; and
   perform, using the audio signal processor, background noise detection to detect the background noise.

15. The system according to claim 10, wherein the at least one processor is further configured to normalized the content objects to remove duplicated and filler words, and to parse and format the content objects.

16. The system according to claim 14, wherein the audio signal is input to the electronic device in response to output, on the electronic device, a query to provide an audio signal.

17. The system according to claim 10, wherein the media content is music.

18. The system according to claim 10, wherein the recommended next media track is a recommended next music track.

19. The system according to claim 10, wherein the at least one processor is further configured to:
   retrieve, from the profile database, at least one other user profile containing historical listening practices of at least one other user, and the determining is based also on the historical listening practice of the at least one other user.

* * * * *

UNITED STATES PATENT AND TRADEMARK OFFICE
CERTIFICATE OF CORRECTION

PATENT NO. : 9,934,785 B1  
APPLICATION NO. : 15/365018  
DATED : April 3, 2018  
INVENTOR(S) : Stéphane Hulaud Page 1 of 1

It is certified that error appears in the above-identified patent and that said Letters Patent is hereby corrected as shown below:

In the Specification

Column 5
Line 39, "First Fourier Transform" should be --Fast Fourier Transform--.

In the Claims

Column 13
Line 13, Claim 15 "normalized" should be --normalize--.

Signed and Sealed this
Twenty-seventh Day of November, 2018

Andrei Iancu
*Director of the United States Patent and Trademark Office*